(12) United States Patent
Sebestyen et al.

(10) Patent No.: US 8,393,141 B2
(45) Date of Patent: *Mar. 12, 2013

(54) METHOD AND ARRANGEMENT FOR MONITORING OF INJECTOR

(75) Inventors: Richard Sebestyen, Göteborg (SE);
Conny Bergkvist, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 268 days.

This patent is subject to a terminal disclaimer.

(21) Appl. No.: 12/596,463

(22) PCT Filed: Apr. 19, 2007

(86) PCT No.: PCT/SE2007/000376
§ 371 (c)(1),
(2), (4) Date: Feb. 3, 2010

(87) PCT Pub. No.: WO2008/130284
PCT Pub. Date: Oct. 30, 2008

(65) Prior Publication Data
US 2010/0146941 A1    Jun. 17, 2010

(51) Int. Cl.
*F01N 3/10* (2006.01)
*F01N 9/00* (2006.01)
*G01M 15/10* (2006.01)

(52) U.S. Cl. ............. 60/286; 60/274; 60/285; 222/52; 222/53; 222/54; 222/55; 222/56; 222/57; 222/58; 222/59; 222/60; 222/61; 222/62; 222/63; 222/64; 222/65; 222/66; 222/67; 222/68; 222/69; 222/450

(58) Field of Classification Search ............. 60/274, 60/285, 286; 222/52–69, 450
See application file for complete search history.

(56) References Cited

U.S. PATENT DOCUMENTS
(Continued)

FOREIGN PATENT DOCUMENTS
DE 102005001119 A1 7/2006
DE 102006005863 A1 8/2007
(Continued)

OTHER PUBLICATIONS
International Search Report for corresponding International Application PCT/SE2007/000386.
(Continued)

*Primary Examiner* — Thomas Denion
*Assistant Examiner* — Brandon Lee
(74) *Attorney, Agent, or Firm* — WRB-IP LLP

(57) ABSTRACT

A method is provided for monitoring of the functionality of an After Treatment Injector (ATI) for injection of a fluid in an engine exhaust gas system upstream of an exhaust gas treatment unit. The monitoring is performed by using a pressure sensor which detects the pressure of the fluid delivered to the ATI for a specific condition or injection cycle. The pressure sensor is located downstream of a flow regulator and upstream of the ATI in a conduit for supplying of a substance from a container to the ATI. An ECU is programmed to perform a predetermined sequence of opening and closing commands for the flow regulator and the ATI in order to monitor the functionality of the flow regulator, the ATI and the pressure sensor. The can be used in connection with an On Board Diagnosis (OBD) system.

14 Claims, 2 Drawing Sheets

U.S. PATENT DOCUMENTS

| | | | | |
|---|---|---|---|---|
| 3,212,671 | A | * | 10/1965 | Rock .................................. 222/1 |
| 3,748,540 | A | * | 7/1973 | Eggenberger et al. ........ 361/170 |
| 5,590,634 | A | * | 1/1997 | Shinohara ..................... 123/520 |
| 5,852,929 | A | | 12/1998 | Kato et al. |
| 2002/0088220 | A1 | | 7/2002 | Weigl |
| 2003/0061805 | A1 | | 4/2003 | Hirooka et al. |
| 2004/0074453 | A1 | | 4/2004 | Roelle et al. |
| 2004/0194446 | A1 | | 10/2004 | Hirroka et al. |
| 2006/0168941 | A1 | * | 8/2006 | Pfaeffle et al. .................. 60/274 |
| 2008/0319686 | A1 | * | 12/2008 | Reusing et al. ................. 702/47 |
| 2009/0159132 | A1 | * | 6/2009 | Gerlach ............................ 137/2 |
| 2010/0139254 | A1 | * | 6/2010 | Sebestyen et al. ............. 60/286 |

FOREIGN PATENT DOCUMENTS

| | | |
|---|---|---|
| EP | 1176292 A1 | 1/2002 |
| JP | 2002038940 A | 2/2002 |
| JP | 2002129945 A | 5/2002 |
| WO | 2005061866 A1 | 7/2005 |

OTHER PUBLICATIONS

International Preliminary Report on Patentability for corresponding International Application PCT/SE2007/000386.

International Search Report for corresponding International Application PCT/SE2007/000786.

* cited by examiner

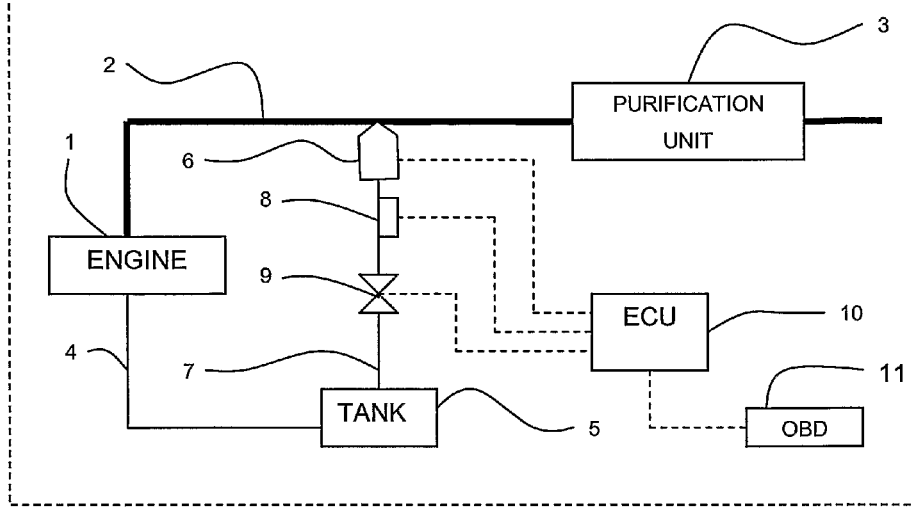
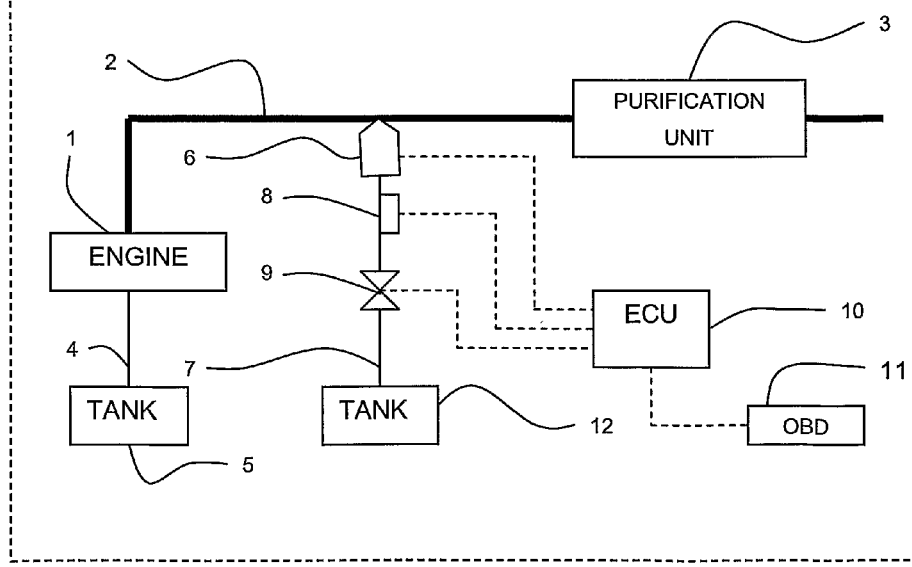

METHOD AND ARRANGEMENT FOR MONITORING OF INJECTOR

BACKGROUND AND SUMMARY

The invention relates to a method and a system for monitoring of the functionality of an injector. In particular, the method and the system relates to the monitoring of an After Treatment Injector (ATI) for injection of a fluid in an engine exhaust gas system. The monitoring is performed by using a pressure sensor which detects the pressure of the fluid delivered to the injector for a specific condition or injection cycle whereby the pressure or pressure fluctuations may be registered and compared with reference values in order to indicate the state of the injector. The invention is suitable to be used as a part of the On Board Diagnosis (OBD) system.

In vehicles today, the feature of being able to monitor, regulate and control an exhaust gas purification system comprising a filter and/or catalyst is of major interest in order to provide a well functioning exhaust gas treatment system. One suggestion to improve the functioning and control of such a treatment system, in particular those systems used for heavy duty vehicles operated by a diesel internal engine, is to include a separate injector in the exhaust gas system downstream of the engine exhaust gas outlet and upstream of at least one of the purifying devices, e.g. a filter, NOx trap or catalyst, in order to inject a liquid for enhancing the performance of the system. The injected liquid may for example be urea, which is used to improve the efficiency concerning NOx reduction, or hydrocarbons, which may be added to be combusted and thus increase the temperature of the gases in order to regenerate the filter.

In the case an exhaust gas purification system comprises such an injector as described above, commonly named After Treatment Injector (ATI), the performance of the system is highly dependent on the functioning of the injector device. If the liquid not is injected properly in the exhaust gas stream there will be negative environmental consequences due to malfunctioning of the purification system.

One known way of indicating the functioning of the system may be to measure the exhaust gases which pass the purification device. In case of NOx reduction, the NOx content after the treating unit may be calculated or measured by a lambda sensor which indicates the level of NOx coming out of the system. From the measured or calculated levels of NOx it is possible to conclude the functionality of the exhaust gas purification system. In the case of addition of hydrocarbons or some kind of fuel in order to elevate the temperature, either the temperature or the content of fuel in the exhaust gases passing the purification system may be measured or calculated in order to determine whether the system is working satisfactorily or not. However, these systems have the drawback of not unambiguously pointing out what part of the purification system that is not working in a sufficient way, e.g. it may be that the NOx trap, the filter and/or the catalyst is deteriorated and not working efficiently enough or it may be the ATI which is malfunctioning. Hence, it is not possible to indicate which part that should be investigated or changed in order to make the system work satisfactorily again.

In EP 1 176 292, a system is disclosed for monitoring of the functionality of an ATI (After Treatment Injector). This system includes an exhaust gas purifying catalyst provided in an exhaust passage of an internal combustion engine, a reducing-agent supplying mechanism for supplying a reducing-agent to the exhaust gas passage upstream of the catalyst and pressure detecting means for detecting a pressure in the reducing-agent supplying mechanism. The reducing-agent supplying mechanism comprises an injection nozzle arranged in an exhaust passage, a reducing-agent supplying passage for conducting reducing-agent to the injection nozzle, an amount controlling valve for controlling an amount of reducing-agent injected by the injection nozzle and a shut-off valve for shutting off the reducing-agent supplying passage.

On the basis of the pressure detected by the pressure detecting means, abnormality of the reducing-agent supplying mechanism is detected by an abnormality determining means. By this system it may for example be possible to detect when reducing-agent is leaked from the reducing-agent supplying mechanism or to detect if reducing agent is leaked out of or into a closed space defined in the reducing-agent supplying mechanism, e.g. when a passage from the shut-off unit to the reducing-agent adding unit is closed. Furthermore, if the reducing-agent adding unit is clogged, it may be detected by the pressure sensing unit that the pressure downstream from the passage opening/closing valve becomes difficult to be lowered after the valve opening period. If the reducing-agent adding unit is brought into a failure in closing, the pressure downstream from the passage opening/closing valve becomes lower. Further, when the passage opening/closing valve is brought into a failure in opening or closing the valve, the passage opening/closing valve is always closed/opened and therefore, the pressure downstream from the passage opening/closing valve becomes constant during the valve opening period and before and after the valve opening period.

Hence, when an abnormality is caused in the reducing-agent adding unit and/or the passage opening/closing valve, the pressure downstream from the passage opening/closing valve during, before or after the valve opening period of the passage opening/closing valve, indicates a value in accordance with the characteristic of the abnormality. Therefore, the abnormality determining means can determine abnormality of the reducing-agent adding unit and/or the passage opening/closing valve on the basis of pressure detected by the pressure detecting means during, before or after the valve opening period of the passage opening/closing valve.

In DE 10 2005 001 119 it is disclosed a method for operating an internal combustion engine. III said patent application it is disclosed a method for analysing the functionality of the pressure sensor, flow regulator and fuel injector by providing a particular scheme of opening and closing of said fuel injector and flow regulator.

However, the system described in EP 1 176 292 does not provide a solution for how an injection system can be systematically checked for its functionality and providing a self-testing function in order to monitor the condition of the reducing-agent supplying mechanism and how to adapt the system for irregularities for individual components and systems, e.g. due to differences at manufacturing, at upgrading of the system or due to deterioration of system components. In addition, the above described system does not provide a solution for checking the pressure sensor itself and may therefore indicate a fault of the valves or injector if the sensor not is working.

Hence, there is still a need to provide an improved method which provides robustness in checking the functionality of an After Treatment injector (ATI).

A system for performing the method according to an aspect of the present invention comprises an After Treatment Substance Injection System (ATSIS) including an After Treatment Injector (ATI). The ATI is located in an engine exhaust system downstream an outlet for exhaust gases from combustion chambers of an engine, e.g. a diesel IC-engine. The ATI is further located upstream of a purification unit in the exhaust gas system, e.g. a filter, catalyst or trap, so as to inject a substance in the exhaust gases in order to enhance a functionality of the system, e.g. the adding of urea to improve the NOx-purification of the exhaust gases or to add HC-containing substance (fuel) for the purpose of regeneration of a filter unit.

As will be evident from the following, it is not necessary to specify the substance to be injected into the exhaust gas stream but the inventive system will work for adding of a desired substance. In some aspects, it will improve the monitoring efficiency if the system cooperates with another On Board Diagnosing (OBD) system which is able to detect the overall functionality of after treatment exhaust gas system.

The ATI is connected to a supply tank of the desired substance to be injected to exhaust gas treatment system, e.g. to the fuel tank of the vehicle, a separate fuel tank or to a urea or ammonia tank, by a conduit.

The After Treatment Substance Injection System (ATSIS) further comprises a flow control unit for controlling the pressure in the conduit for supplying of the substance from the container to the After Treatment Injector (ATI). The flow control unit may for example be a valve arrangement which may be closed, to cut off the connection to a pressurized system upstream the valve, or open, to set the pressure downstream the valve to the same as upstream, e.g. to the same value as a pressurized tank. As another alternative the flow control unit may be a pump or compressor which may pressurize the system downstream of said pump or compressor.

A pressure sensor is located downstream of said flow control unit in the ATSIS so as to be able to measure the pressure of the substance which is to be injected from the ATI into the exhaust gas stream.

The ATSIS also comprises an Electronic Control Unit (ECU) which is controlling the opening and closing of the flow control unit and the After Treatment Injector (ATI).

In order to monitoring the system performance of the ATSIS, an On Board Diagnosing (OBD) system is connected to the ECU and the pressure sensor. The OBD is provided with comparative data for the functionality of the After Treatment Substance Injection System (ATSIS) in order to detect abnormal functionality of the ATSIS.

The system may of course be monitored continuously by the pressure sensor during normal drive of a vehicle comprising the above described system. However, it is not sure that the normal monitoring function will be sufficient to detect some abnormal activities or it may also be possible that the system indicates an error when the system is performing as it should, e.g. when there is a malfunctioning of the pressure sensor. By the use of a specific, predefined sequence of opening and closing commands for the flow control unit and the After Treatment Injector (ATI) for the sole purpose of monitoring the functionality of the system, a more accurate and reliable measurement of the system will be achieved. It will thus be easier to detect malfunctioning of the ATSIS at an earlier stage and also to better locate the cause of the malfunctioning of the ATSIS. Hence, the ECU may be programmed to send out control signals to the flow control unit and the ATI to close and open following a specific sequence and timing for changing their positions. During such a monitoring cycle, the output values from the pressure sensor are logged such that the actual pressure data may be compared with the comparative data in the OBD system. According to specific criteria for indicating a malfunction of the ATSIS (e.g. a certain pressure value outside the allowed range or a change of a pressure value being outside the allowed limit), it may be possible to deduce which part, e.g. the flow control unit, the After Treatment Injector (ATI) and the pressure sensor, which is malfunctioning and in which way it is deficient.

The control sequence may for example be performed at certain time intervals, on demand of a driver or as a consequence of a fault detected in the exhaust gas treatment system by an On Board Diagnosing (OBD) system. There may also be several different control sequences programmed in the ECU which differs in the consecutive order of performing the opening and closing commands and in the time intervals for the changes of the status of the controlled devices (the ATI and the flow control unit) from open to closed. For example, when it is desired to monitor if there is a small leak in the system, it might be desired to keep the controlled devices in a fixed state so as to be able to detect a slow change in the pressure.

According to an embodiment of the invention, the control sequence to be performed is as follows:
1. Set the flow control unit to open and set the ATI to closed.
2. Close the flow control unit and keep the ATI closed.
3. Keep the flow control unit closed and open the ATI
4. Keep the flow control unit closed and close the ATI.
5. Open the flow control unit to open and keep the ATI closed.

The time duration that each sequential step keep the ATI may be adjusted to best fit the purpose of what feature that is to be detected. However, in order to perform data which is comparable with the reference data in the OBD system the sequential monitoring should be performed according to any of these reference sequential timings.

In table 1 below it is described the output from the pressure sensor depending on different possible faults of a number of relatively frequently occurring faults when using the above described control sequence. In this system it is suggested that the flow control unit comprises a regulating valve which may be closed or opened in order to allow flow of the desired substance from a pressurized supply through a conduit to the ATI. The pressurized supply and the valve may of course be substituted for a pump or the like which also may be detected according to the table below. In that case "Valve closed" corresponds to non-functioning of the pump, "Valve clogged" to reduced pumping effect of the pump, "valve leakage" to a continuous, low pumping action of the pump and "Valve open" to a continuous high pumping effect of the pump.

TABLE 1

| Functionality | 1 | 2 | 3 | 4 | 5 |
| --- | --- | --- | --- | --- | --- |
| All functions OK | System pressure | System pressure | Normal pressure drop curve | Low pressure | Normal pressure rise curve |
| ATI closed | System pressure | System pressure | System pressure | System pressure | System pressure |
| ATI clogged | System pressure | System pressure | Slow pressure drop curve | Low pressure | Normal pressure rise curve |

TABLE 1-continued

| Functionality | 1 | 2 | 3 | 4 | 5 |
|---|---|---|---|---|---|
| ATI leakage | System pressure | Pressure drop | Reaches fast low pressure | Low pressure | Slow pressure rise curve |
| ATI open | System pressure or lower pressure * | Fast pressure drop to low pressure | Low pressure | Low pressure | Low pressure, (maybe a little rise |
| Valve closed | Low pressure (could be system pressure if the conduit is full) | Low pressure (could be system pressure if the conduit is full) | Low pressure (could be normal pressure drop curve) | Low pressure | Low pressure |
| Valve clogged | System pressure | System pressure | Normal pressure drop curve | Low pressure | Slow pressure rise curve |
| Valve leakage | System pressure | System pressure | Slow pressure drop curve | Increased pressure | Reaches fast system pressure |
| Valve open | System pressure | System pressure | System pressure or extra slow pressure drop curve * | System pressure or fast increased pressure to system pressure | System pressure |
| Sensor High | System pressure | System pressure | System pressure | System pressure | System pressure |
| Sensor middle | Middle pressure | Middle pressure | Middle pressure | Middle pressure | Middle pressure |
| Sensor low | Middle pressure | Middle pressure | Middle pressure | Middle pressure | Middle pressure |

* = The different responses are dependant on flow ratio between valve and ATI (e.g. if the valve is open and allowing a larger flow than the ATI, the valve will fill up the system fast and keep the pressure constant also when the ATI is open).

By following a programmed sequence of opening and closing commands for the flow control unit and the (ATI) it will be possible to distinguish faults of different components which not may be distinguished by one single measurement or by only measuring the absolute values of the pressure in different conditions. For example, the occurrence of a slow pressure drop curve in step 3 (The valve is kept closed and the ATI is opened) indicates either valve leakage or ATI clogged. However, these faults may be distinguished in step 4 (The valve is kept closed and the ATI is closed) where an increased pressure is detected if the valve is leaking while the pressure is kept at a constant, low pressure if the fault indicated is caused by a clogged ATI.

Even though there are certain features in the schematic table of fault indications in table 1 which seems to be not distinguishable from each other, the fault may be localized by the use of an OBD which is monitoring the overall exhaust gas purification system. For example, the symptoms that a sensor is stuck in a position indicating low pressure and the symptom that the valve is stuck in closed position (and the conduit is empty) have the same indication in table 1. Likewise, when the sensor is stuck in a position indicating high pressure and the ATI is stuck in closed position, the same pressure indications are present according to table 1. However, it will still be easy to monitor if it is the sensor or the valve/ATI which is failing by using the OBD system checking the functionality of the overall performance of the exhaust gas treatment system. If the functionality of the purification of gases still is working satisfactorily, it can unambiguously be deduced that it is the pressure sensor which is failing while if the purification of gases not is working satisfactorily, it is most probably the valve or ATI which is failing. If for example, an elevated amount of NOx is detected, it may be an indication of malfunctioning of an ATSIS for urea. If it is indicated constant high or low pressure from the pressure sensor during the test cycle, it may be deduced that the flow control (low pressure indicated) or the ATI (high pressure indicated) are stuck in closed positions. Likewise, the same distinguishing of a faulty component may be done if it is detected a relatively constant temperature of the exhaust gases downstream a filter during a regeneration cycle. Such monitoring systems, using temperature sensors, lambda sensors or the like indicating devices for monitoring the state of a system, are well known in the art and are commonly used in vehicles OBD systems. Hence, it would thus be possible to add this information together with the information from the ATSIS to be able to distinguish an error indication of the sensor from an error of the valve or ATI function.

The ATSIS monitoring system may for example only be used when there is a malfunctioning in the exhaust gas treatment system so as to deduce whether it is the ATSIS or some of the exhaust gas purification units, e.g. a filter, catalyst or trap, which is malfunctioning. A positive result from the test cycle described above would clearly indicate that the ATSIS is working as it should and it can be deduced that it is some of the other components of the system which not is working satisfactorily.

In table 1, a very simplified model for a certain test cycle is described describing very briefly the principles of how the inventive idea may be used. Preferably there is a curve made for each desired test cycle comprising the standard values for a working ATSIS. This curve may be made as a general curve according to a standard value for the system and a specific cycle. It would also be possible to log a cycle for a specific system of a specific vehicle. In this case it would be possible to adjust the curve for the natural deterioration of a system which still works well enough even though its efficiency is not as good as for a brand new system. For example, there has been an inspection including renovation and/or replacement of one or several parts of the exhaust gas treatment system including an ATSIS. When the replacement/renovation is considered done, and the system should be ready to work, a new reference curve may be logged and used as the comparative curve for this specific system. Some times this adaptation may be necessary if the system is upgraded and some essential parameters are adjusted or replacement of components demanding different operating parameters, e.g. a new ATI is mounted to the system which requires a higher delivery pressure. The above monitoring system may thus easily be modified in order to compensate for the changes introduced in the system and still work in a satisfactorily way for controlling the performance of the system.

Below follows a detailed description of a system which is adapted to involve the features of the above described method. It shall be noted that the system described herein may either be constructed as described below or used to modify an existing system, e.g. the system described in EP 1 176 292, so as to provide an improved monitoring of an after treatment substance injection system.

BRIEF DESCRIPTION OF DRAWINGS

FIG. 1 shows a schematic figure of an engine exhaust gas treatment system comprising an After Treatment Substance Injection System (ATSIS)

FIG. 2 shows an engine exhaust pressure regulating system according to the present invention FIG. 3 A diagram showing the shape of a pressure curve for a test cycle according to a preferred embodiment.

DETAILED DESCRIPTION

Figure 3:
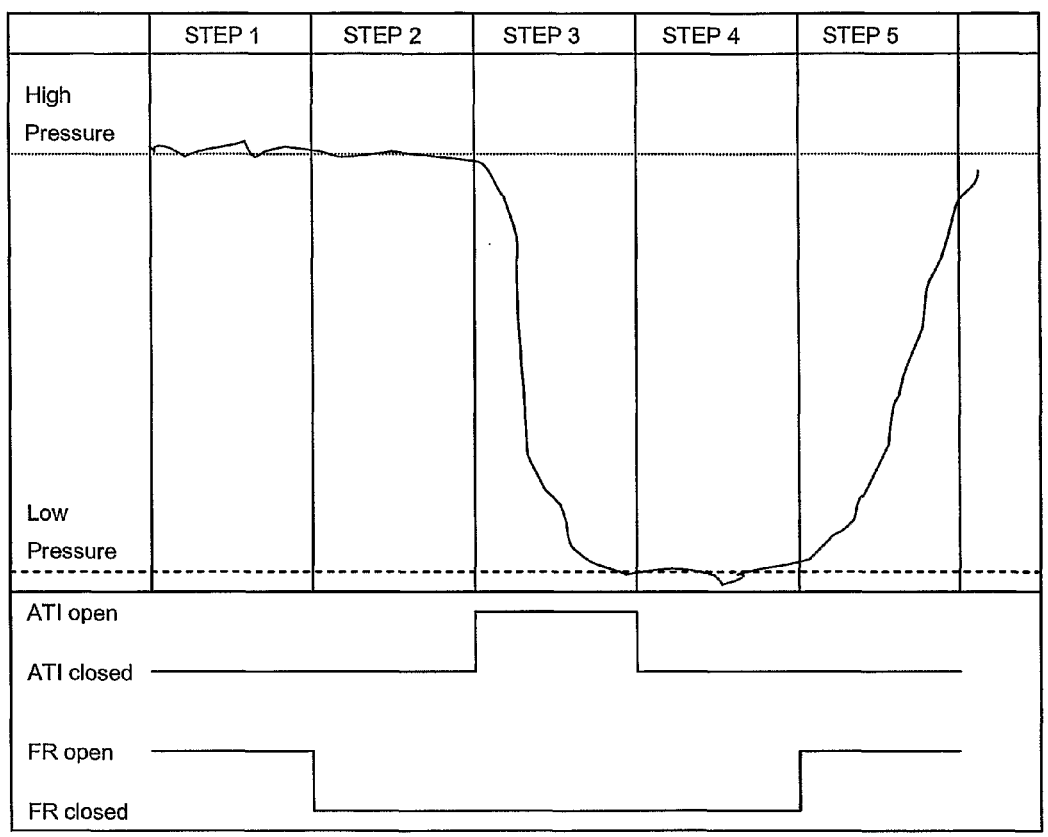

In FIG. 1 is very briefly described the different parts of an engine exhaust gas system comprising an After Treatment Substance Injection System (ATSIS) according to the invention. An internal combustion engine 1 is connected to an exhaust gas pipe 2 for collecting and guiding of exhaust gases from the engine to an exhaust gas treatment unit 3. The exhaust gas treatment unit 3 may for example be a filter, reduction or oxidation catalyst, NOx-trap or a combination of such treatment devices. Fuel for the engine 3 is supplied by a fuel conduit 4 from a fuel tank 5. An After Treatment Injector (ATI) 6 is located in the exhaust gas pipe 2 downstream of the engine 1 and upstream of the purification unit 3. The ATI 6 is connected to the tank 5 by means of an after treatment substance conduit 7 so as to allow a flow of substance from the tank 5 to the ATI 6. The flow of substance may be caused either due to a pressurized tank or a pumping arrangement. A pressure sensor 8 is located in the substance conduit 7 upstream of an outlet nozzle (not shown) of the ATI and downstream of a flow regulator 9, e.g. a valve. The ATI 6, the pressure sensor 8 and the flow regulator 9 are connected to an Electronic Control Unit (ECU) 10. The ECU 10 controls the flow regulator 9 and the ATI 6 so as to perform the desired actions (opening/closing commands) in order to inject the substance from the tank 5 into the exhaust gas pipe 2. The ECU 10 further receives signals from the pressure sensor 8 so as to be able to monitor the pressure in the conduit at any time and a pressure curve may be made from continuously measured values or from discrete pressure values sampled at desired time intervals. In order to be able to monitor the system as described herein, the pressure sensor 8 shall be located in between two devices which control the flow, e.g. the ATI 6 and the flow regulator 9. In the present case, since the substance conduit 7 is connected to a common fuel tank 5 which normally not is pressurized, the flow regulator preferably comprises a pump (not shown), for supplying a substance from the tank 5 to the ATI 6, and a valve arrangement which may be separate parts or an integrated unit. The pump may either be designed to deliver a certain pressure or be able to produce a variable pressure to the substance conduit 7 downstream the pump. The ATI 6 may include a nozzle which is adapted to allow a flow of substance when the pressure is above a certain limit and also provided with shut off valve which makes it possible to completely shut off the flow. It is also possible to have a nozzle which may change its threshold value for delivering of fluid. The nozzle and valve may be separated parts or one integrated functional part in the ATI 6. The ECU may further be connected to an On Board Diagnosis (OBD) system 11 such that it is possible to use the information from the ECU 10 and the monitoring sequence in order to be able to check the indications from the test cycle with other data concerning the overall system in order to improve the performance of the diagnosing system. The OBD system 11 may for example have information concerning the overall performance of the exhaust gas treatment system which in addition to the information from the ECU 10 facilitates the diagnosing and recognizing of a malfunctioning unit.

As described herein, the OBD 11 and ECU 10 are different physical entities. It is obvious to the skilled person in the art that these functions may be one single unit or that these units may be divided into further subunits. Also to be note, the pressure sensor 8 is connected to the ECU 10 in this figure but may also as well be connected to the OBD 11.

As described above, the ATI 6, the pressure sensor 8 and the flow regulator 9 are separate units. These elements may also be integrated parts, e.g. a pressure sensor 8 integrated in the ATI 6 or flow regulator 9, as long as the pressure sensor 8 is sensing the pressure in the part of the conduit located between the ATI 6 and the flow regulator 9.

In FIG. 2, the only difference compared to FIG. 1 is that the substance conduit 7 is connected to a separate tank 12. In this case, the tank 12 is preferably pressurized and the flow regulator 9 is a valve which may be a rather simple valve only having the position of open and closed or having the ability to set a desired pressure in the substance conduit 7 downstream the conduit, e.g. to allow the flow of substance into the downstream conduit to build up a desired pressure and then close the valve or set the valve to keep a constant value of the pressure.

Hence, in this case, it shall be noted that the separate tank may contain either the same substance, i.e. fuel, or another substance, e.g. urea, ammonia or water. In addition, it will be possible to have another substance than a liquid, e.g. a gas, to be introduced into the system, in a particular embodiment it may be used hydrogen as fuel for the regeneration of a filter since hydrogen does not provide any additional particles which may be clogged to the filter and therefore provide a pure combustion product of water and no residual, not burnt fuel.

In FIG. 3, a curve is shown for a test cycle in which the ATSIS system is working as normal. In this figure, the expected pressure for each sequential step in the predetermined sequence of opening and closing commands for the flow control unit and the After Treatment Injector (ATI) is described. The upper straight line is marked as the "High pressure" level and indicates the same pressure as in a pressurized tank communicating with the space wherein the pressure sensor 8 is located (or may indicate the set pressure level to be delivered from a pump unit), e.g. the pressure sensed when a valve 9 is open and the ATI 6 is shut. The lower straight line in the diagram indicates the "Low pressure" levels which corresponds to the pressure in the exhaust gas system, e.g. when a valve 6 is closed (or a pump 6 for delivering a pressurized fluid is in a non-working state) and the ATI 6 is open. Below the curve indicating the pressure detected by the pressure sensor 8 (see FIG. 1 or 2) is an indication of the state of the ATI 6 (FIG. 1 or 2) and the flow regulator (FR) 9 (FIG. 1 or 2). In this case, the ATI is set to completely open or completely shut and the flow regulator is a valve which is controlled to be either open or closed to control the flow of a pressurized liquid upstream.

In order to be able to accurately set a reference curve, it should be set under those conditions for which the engine is expected to be working when the cycle is performed. The reference curve, or curves, made up may be an average curve from a multitude of curves and there may also be a multitude of different reference curves for different conditions and different parameters, e.g. the timing for keeping each set conditions in each step may vary and there may also be different step sequences. The curves may be system specific, i.e. a reference curve is made up for each, individual system for each vehicle or may be made at a test rig for a well defined set up. In this curve, the test cycle is set up according to the specific cycle described in table 1 comprising the following steps:

1. Set the flow control unit to open and set the ATI to be closed.
2. Close the flow control unit and keep the ATI closed.
3. Keep the flow control unit closed and open the ATI
4. Keep the flow control unit closed and close the ATI.
5. Open the flow control unit to open and keep the ATI closed.

It is evident that the accuracy may be improved by making several reference curves of the system when it is possible to positively assure that the system is working, it will also be possible to make curves for a defective system if, for example, it is possible to simulate a leakage in some part of the system by controlling the closure of the flow regulator or ATI to not close completely in the closed state or not opening the ATI completely in its open state and thus simulating a clogging of the injector. In order to detect leakage it might be advisable to use a cycle having a larger duration of step 3, i.e. a step wherein the ATI and the flow control are closed so as to define a closed space with a pressurized liquid inside, which makes it possible to detect also a small leakage having a slow decrease in the pressure.

Hence, the skilled person in the art may within the scope of the present invention modify and try out different test cycles and make up specific reference curves for specific conditions in order to select the desired way of testing and monitoring a specific after treatment substance injection system.

The invention claimed is:

1. A method for monitoring of an exhaust gas purification system for an internal combustion engine, the exhaust gas system comprising:
    an exhaust gas purification unit
    an After Treatment Substance Injection System (ATSIS) including
        a) an After Treatment injector (ATI) for injection of a substance into the exhaust gas system, the ATI located in the exhaust gas system upstream of the exhaust gas purification unit,
        b) a conduit for supplying of the substance from a container to the ATI,
        c) a flow regulator for controlling flow in the conduit of the substance from the container to the ATI,
        d) a pressure sensor located downstream of the flow regulator,
        e) an Electronic Control Unit (ECU) for control of the flow regulator and the ATI, and
    an On Board Diagnosing (OBD) system which is connected to the ECU and the pressure sensor connected to the OBD, either directly or via the ECU, the OBD being provided with comparative data for functionality of the After Treatment Substance Injection System (ATSIS) in order to detect abnormal functionality of the ATSIS,
    the ECU being programmed to perform a predetermined sequence of opening and closing commands for the flow regulator and the ATI in order to monitor functionality of the flow gas regulator, the ATI and the pressure sensor, where output values from the pressure sensor are compared with the comparative data in order to determine which one of the flow regulator, the ATI or the pressure sensor is malfunctioning,
    the method comprising
        injecting the substance into the exhaust gas system upstream of the exhaust gas purification unit,
        performing, under control of the ECU, the following sequential steps
        I. setting the flow regulator to open and setting the ATI to be closed,
        II. closing the flow regulator and keeping the ATI closed,
        III. keeping the flow regulator closed and opening the ATI,
        IV. keeping the flow regulator closed and closing the ATI without opening the flow regulator before closing the ATI, and
        V. opening the flow regulator to open and keeping the ATI closed,
        while performing, the sequential steps, comparing output values from the pressure sensor with the comparative data, and
        identifying a malfunctioning one of the flow regulator, the ATI or the pressure sensor based on the comparison.

2. A method according to claim 1, comprising setting to different values, via the ECU, durations of time of the sequential steps for keeping the flow regulator and the ATI in their programmed positions.

3. A method according to claim 1, comprising monitoring, via the OBD system, functionality of the exhaust gas purifying devices in the exhaust gas system, and indicating, via the OBD system, a malfunctioning of the pressure sensor when an abnormality in the ATSIS is detected while the exhaust gas purifying devices in the exhaust gas system function normally.

4. A method according to claim 1, wherein the comparative data for the functionality of the ATSIS is based on pre-programmed data for the ATSIS from one or several test cycles from a test rig.

5. A method according to claim 1, wherein the comparative data for the functionality of the ATSIS is based on one or several test cycles for the exhaust gas system.

6. A method according to claim 1, comprising controlling, via the OBD system, the ECU to perform a predetermined sequence of opening and closing commands for the flow regulator and the ATI in order to monitor the functionality of the flow regulator, the ATI and the pressure sensor when it is indicated that the functionality of the exhaust gas purifying devices in the exhaust gas system is abnormal.

7. A method according to claim 2, comprising monitoring, via the OBD system, functionality of the exhaust gas purifying devices in the exhaust gas system, the OBD system indicating a malfunctioning of the pressure sensor when an abnormality in the ATSIS is detected while the exhaust gas purifying devices in the exhaust gas system function normally.

8. A method according to claim 2, wherein the comparative data for the functionality of the ATSIS is based on pre-programmed data for the ATSIS from one or several test cycles from a test rig.

9. A method according to claim 2, wherein the comparative data for the functionality of the ATSIS is based on one or several test cycles for the exhaust gas system.

10. A method according to claim 2, comprising controlling, via the OBD system, the ECU to perform a predetermined sequence of opening and closing commands for the flow regulator and the ATI in order to monitor the functionality of the flow regulator, the ATI and the pressure sensor when it is indicated that functionality of the exhaust gas purifying devices in the exhaust gas system is abnormal.

11. A method according to claim 4, comprising monitoring, via the OBD system, functionality of the exhaust gas purifying devices in the exhaust gas system, the OBD system indicating a malfunctioning of the pressure sensor when an abnormality in the ATSIS is detected while the exhaust gas purifying devices in the exhaust gas system function normally.

12. A method according to claim 3, wherein the comparative data for the functionality of the ATSIS is based on pre-programmed data for the ATSIS from one or several test cycles from a test rig.

13. A method according to claim 3, wherein the comparative data for the functionality of the ATSIS is based on one or several test cycles for the exhaust gas system.

14. A method according to claim 3, comprising controlling, is the OBD system, the ECU to perform a predetermined sequence of opening and closing commands for the flow regulator and the ATI in order to monitor the functionality of the flow regulator, the ATI and the pressure sensor when it is indicated that the functionality of the exhaust gas purifying devices in the exhaust gas system is abnormal.

* * * * *